July 25, 1967 R. L. VAN ALLEN ET AL 3,333,178

MAGNETIC CONTROL APPARATUS

Filed Dec. 11, 1958 4 Sheets-Sheet 1

INVENTORS.
CHARLES E. HARDIES
ROLAND L. VAN ALLEN
BY Shanley & O'Neil
ATTORNEY

MAGNETIC CONTROL APPARATUS

Filed Dec. 11, 1958 4 Sheets-Sheet 2

INVENTORS.
CHARLES E. HARDIES
ROLAND L. VAN ALLEN
BY Shanley & O'Neil
ATTORNEY

July 25, 1967 R. L. VAN ALLEN ET AL 3,333,178

MAGNETIC CONTROL APPARATUS

Filed Dec. 11, 1958 4 Sheets-Sheet 3

INVENTORS.
CHARLES E. HARDIES
ROLAND L. VAN ALLEN
BY Shanley & O'Neil
ATTORNEY

MAGNETIC CONTROL APPARATUS

Filed Dec. 11, 1958 4 Sheets-Sheet 4

INVENTORS.
CHARLES E. HARDIES
ROLAND L. VAN ALLEN
BY Shanley & O'Neil
ATTORNEY

United States Patent Office 3,333,178

Patented July 25, 1967

3,333,178
MAGNETIC CONTROL APPARATUS

Roland L. Van Allen and Charles E. Hardies, Butler, Pa., assignors to Magnetics, Inc., a corporation of Pennsylvania Filed Dec. 11, 1958, Ser. No. 779,778
5 Claims. (Cl. 321—38)

This invention relates to improvements on electrical control apparatus and more particularly to magnetic control apparatus and to magnetic circuitry for controlling solid state devices of the type having thyratron characteristics.

A class of recently developed solid state devices include three terminals, two of which may be considered as main current carrying terminals and the third as a gate or control terminal. These devices are so characterized that with respect to the main current carrying terminals the devices at all times present a high impedance to current flow in one direction, that is a high reverse impedance, and in this respect the device exhibits the characteristics of a rectifier, while the devices present a high impedance to the flow of current between the main terminals in the opposite direction, that is a high forward impedance, until the device is energized or fired upon application of a control signal to the gate or control terminal. When the devices are fired the forward impedance with respect to the main current carrying terminals abruptly drops to an extremely low value and the flow of current through the devices between the main current carrying terminals is independent of and does not require application of a control or energizing signal to the gate terminal and will continue so long as a potential is maintained across the main current carrying electrodes. When the potential across the main current carrying electrodes is extinguished the devices return to their normal or unenergized condition presenting a high forward impedance and will not pass current although a potential is applied across the main current carrying electrodes, providing a breakdown potential is not reached, until a control signal is applied to the gate terminal to again energize the devices. These devices have been described as "controlled solid state rectifiers" since they function as a rectifier in at all times presenting a high reverse impedance and normally a high forward impedance until "controlled" upon energization or firing responsively to a signal being applied to the gate or control terminal. It is apparent from the foregoing that this class of solid state devices possess certain operational characteristics of a thyratron and may therefore be described as "solid state thyratrons" or "solid state devices possessing thyratron characteristics." The latter terms are used throughout this description and in the appended claims to define solid state devices of the class described above.

Furthermore, as a descriptive aid the main current carrying terminals of the solid state devices of the class described above are referred to herein and in the appended claims as "anode terminal" and "cathode terminal" although the terms "anode" and "cathode" are not generally employed in connection with solid state devices and probably would not be used to designate the components of these solid state devices to which the main current carrying terminals are connected.

Solid state devices having thyratron characteristics include features in addition to the fact that they are solid state devices, which render such devices superior to conventional thyratrons in certain applications. For example, solid state devices having thyratron characteristics when fired, present a lower forward impedance such that the voltage drop across the device measured at the main current carrying terminals is only 1.0 volt at 5 amperes which is much lower than the forward impedance of fired conventional thyratrons. Also a solid state thyratron fires or switches within one microsecond or less upon application of an energizing control signal to the gate terminal, and returns to its normal condition presenting a high forward impedance in only three microseconds following removal of a potential across the main current carrying electrodes. In conventional thyratrons the deionization time is several milliseconds. Furthermore, solid state thyratrons may be fired or energized by a low voltage control signal of the order of 3 volts.

It is apparent from the foregoing that solid state devices possessing thyratron characteristics have potential utility in numerous applications including control applications in fields where conventional thyratrons are not applicable, especially in cases where high speed operations of great accuracy and reliability are required. However, certain characteristics of the solid state thyratron present control problems and at the present time, insofar as it is known, the art does not include an adequate arrangement for controlling these solid state devices. By way of example, when a solid state thyratron is fired or energized the input impedance to the control or gate terminal is quite low requiring a low impedance control signal. In general, the voltage required to fire a solid state thyratron is only 3 volts and under normal operating conditions current in excess of 25 milliamperes must be supplied to the control terminal, while to prevent damage to the solid state thyratron the control voltage must not average higher than 5 volts at 300 milliamperes. In order to meet these control signal requirements it has been suggested to employ magnetic amplifiers and pulse forming networks. While arrangements of this character may be adequate under certain circumstances they do not provide an optimum control for solid state devices having thyratron characteristics and consequently materially limit application of these devices.

It is therefore an object of the present invention to provide a novel circuit for controlling solid state devices having thyratron characteristics.

Another object is to provide a novel magnetic circuit providing optimum control of solid state devices having thyratron characteristics.

Another object of the present invention is to provide a novel control apparatus including magnetic circuitry and a solid state device or devices of the type possessing thyratron characteristics.

Another object is to provide a novel magnetic circuit providing almost ideal power control.

Another object is to provide novel electrical control apparatus including magnetic circuitry which provides power only at the instant of control.

Another object is to provide a novel electrical apparatus capable of controlling relatively unlimited power.

A further object of the present invention is to provide a novel electrical apparatus including magnetic circuitry providing isolation of single or plural control signals.

A further object is to provide a novel electrical apparatus of the foregoing character capable of performing proportioning functions and switching logic functions including memory logic.

A still further object of the present invention is to provide a novel electrical control apparatus including magnetic circuitry characterized in such a manner so that the magnetic circuitry may be designed for maximum speed of response in accordance with the particular control or controls desired.

A still further object is to provide a novel electrical control apparatus including magnetic circuitry in which variations in the load have no effect on the magnetic circuitry.

Other objects and features of the present invention will appear more fully from the following detailed description considered in connection with the accompanying drawings which disclose several embodiments of the invention. It is to be expressly understood however that the drawings are designed for purposes of illustration only and not as a definition of the limits of the invention, reference for the latter purpose being had to the appended claims.

In the drawings, in which similar reference characters denote similar elements throughout the several views.

In general, the present invention provides an electrical apparatus including one or more solid state devices having thyratron characteristics fed from a power source to be controlled, and a magnetic circuit for producing a control signal or signals for the solid state device or devices in predetermined synchronism with the power source, as determined by one or more isolated control signals, in which the magnetic circuit provides power only at the instant of firing of the solid state device or devices and in which the control signal or signals are automatically regulated to prevent damage to the solid state device or devices.

Figure 1:
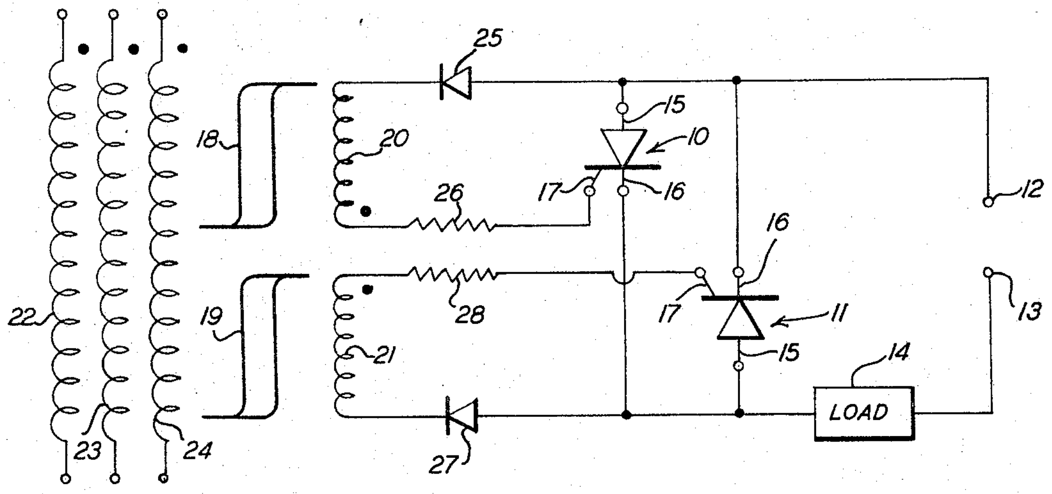
FIGURE 1 is a diagrammatic illustration of electrical apparatus embodying the principles of the present invention designed for controllably delivering full wave alternating current power.

The electrical apparatus shown in FIGURE 1 of the drawings includes a pair of solid state devices having thyratron characteristics 10 and 11 connected in opposite relation across an alternating current power source applied to terminals 12 and 13 and in series with a load impedance 14. The solid state devices are each provided with an anode terminal 15, a cathode terminal 16 and a gate or control terminal 17. The apparatus further includes a pair of saturable magnetic cores 18 and 19 preferably constructed of a material presenting a substantially rectangular hysteresis characteristic each having an associated gate winding 20 and 21, respectively, and both being provided with a plurality of control windings 22, 23 and 24 adapted to be energized with direct current control voltages, the control windings and the gate windings having the dot indicated winding sense or polarity relationship. One end of the gate winding 20 is connected to terminal 12 of the alternating current power source through a rectifier 25 while the other end is connected through resistor 26 to the gate or control element terminal 17 of the solid state device 10. The opposite ends of the gate winding 21 of the saturable core 19 are connected in a similar but reverse relationship to the terminal 13 of the alternating current supply through rectifier 27 and through resistor 28 to the gate or control element 17 of the solid state device 11.

The solid state devices 10 and 11 are of the type having thyratron characteristics and as discussed above present high reverse impedance and normally high forward impedance except when energized by a control signal applied to the gate or control terminal at which time the forward impedance abruptly drops to an extremely low value and the device remains in that condition independently of energization of the gate terminal so long as a potential is applied across the anode and cathode terminals, and upon termination of the latter potential the device reverts to its normal condition and presents a high forward impedance. A number of solid state devices of this character are now available to the industry. General Electric Company offers devices identified as "Silicon Control Rectifiers" and Westinghouse Electric Corporation produces devices identified by the name "Trinistors."

Figures 2, 3:
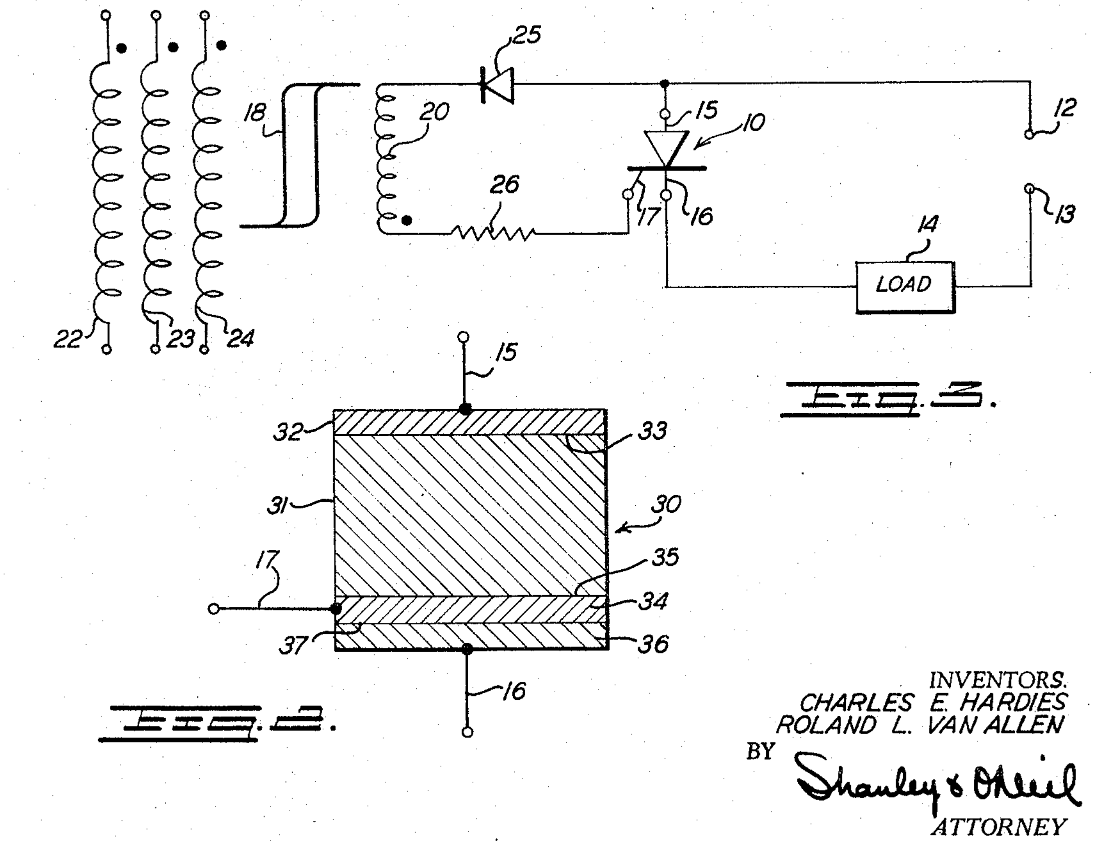
FIGURE 2 is a diagrammatic illustration of a type of solid state device having thyratron characteristics utilized in connection with the present invention.
FIGURE 3 is a diagrammatic illustration of electrical apparatus embodying the principles of the present invention designed for controllably producing half wave rectified output.

FIGURE 2 of the drawings diagrammatically illustrates a solid state device of a type having thyratron characteristics that may be utilized in connection with the present invention. It is to be expressly understood that all solid state devices having thyratron characteristics may be used with the present invention and the solid state device shown in FIGURE 2 is merely for the purpose of illustration and is not intended to limit the invention to that type of solid state device or its equivalent. In particular, while the solid state device shown in FIGURE 2 includes three junctions, it is to be understood that solid state devices including a different number of junctions may be employed in the present invention providing the devices exhibit those characteristics of a thyratron as discussed above.

The solid state device shown in FIGURE 2 includes a wafer 30 of a semi-conductive material such as germanium or silicon including a relatively thick zone 31 possessing N-type conductivity characteristics and a relatively thin zone 32 of P-type conductivity characteristics presenting a P-N junction 33. The wafer also includes a relatively thin zone 34 of P-type conductivity characteristics presenting a P-N junction 35 and a relatively thin zone N-type conductivity characteristics presenting a P-N junction 37. The junctions 33, 35 and 37 may be of the grown or fused type or a combination of such types may be used. It is not necessary for the purposes of the present invention to provide a detailed theoretical discussion of the operation of this device. It will suffice to state that its operation exhibits thyratron characteristics as outlined above and that the zone 34 is believed to act as a gate when unenergized so that the device presents a high forward impedance when in that condition. For reasons discussed above the terminals joined to the zones 32, 36 and 34 are designated as the anode terminal 15, the cathode terminal 16 and the gate or control terminal 17, respectively. It should be noted that the zones 34 and 36 provide a P-N device between the gate terminal 17 and the cathode terminal 16.

In operation of the apparatus shown in FIGURE 1, when the alternating current of the power supply connected across terminals 12 and 13 has passed through zero potential and is beginning a positive half cycle the solid state device 11 presents a high reverse impedance, the solid state device 10 presents a high forward impedance, since the control element is non-energized, and the rectifier 27 blocks current flow through the gate winding 21 of the saturable core 19. Also, the gate winding 20 presents a high impedance, since the core 18 is not saturated, and no power is applied across the load 14. Current however will flow through the gate circuit of the core 18, i.e., coil 20, resistor 26, gate terminal 17, a portion of the solid state device 10, cathode terminal 16 and load 14, to carry the material of the core 18 toward one level of saturation, the parameters of the gate circuit being selected to insure adequate current flow to effect this performance. The core 18 will be driven to saturation at some point during the positive half cycle of the alternating current supply source as determined by the combined effect of the sum of the control signals applied to the windings 22, 23 and 24. At the instant the core 18 saturates the impedance of the gate winding 20 abruptly drops with a concomitant increase in current through the gate winding 20. The abrupt current variation is applied as a control signal through resistor 26 to the gate terminal of the solid state device 10 to energize or fire the device within a microsecond or less following saturation of the core. When fired the forward impedance of solid state device 10 abruptly drops very close to zero and the power supply is connected across the load 14 through the remaining portion of the positive half cycle. The solid state device 10, when fired, presents a substantially complete short-circuit across the winding 20 and thereby terminates the control signal to the solid state device. Thus, according to the present invention the arrangement for producing and applying a control signal to the gate of the solid state device provides an automatic clipping or limiting operation which prevents application of a control signal of a magnitude which exceeds the design limitations of the solid state device.

As the positive half cycle of the alternating supply voltage terminates and passes through zero the solid state device 10 returns to its initial condition presenting a high forward impedance. As the supply voltage increases from zero through the negative half cycle there is no current flow through the load 14, except the gate current of coil 21, due to the high reverse impedance of the solid state device 10, the high reverse impedance of the rectifier 25, the high forward impedance of the solid state device 11 and the high impedance of gate winding 21 since core 19 is in a non-saturated condition. However, current flow in the gate circuit of the core 19, i.e., rectifier 27, gate winding 21, resistor 28, gate terminal 17, and cathode terminal 16 of solid state device 11, will drive the core 19 to saturation at a predetermined angle of the negative half cycle of the power supply as determined by the control signal or signals applied to the windings 22, 23 and 24. Upon termination of the negative half cycle, when the alternating current voltage passes through zero, the solid state device 11 returns to its normal condition presenting high forward impedance, and as the alternating current voltage progresses through the next positive half cycle the operation described above repeats. During the negative half cycle, current flow through the gate winding 21 induces voltage in the gate winding 20 through the control circuit and this induced voltage together with the combined effect of the control signals applied to the control windings 22, 23 and 24 act to effect resetting of the core 18 to the initial saturation level for response to the next positive half cycle. A corresponding action takes place during positive half cycles to reset the core 19. The resetting time is a function of the value of resistors 26 or 28, as the case may be, and the circuit parameters may be selected so that the cores 18 and 19 are each driven to saturation during alternate half cycles of the alternating current supply voltage.

FIGURE 3 discloses an apparatus according to the present invention for controllably supplying half wave rectified alternating current. This apparatus is similar to the upper half of the apparatus of FIGURE 1 including solid state device 10, saturable core 18 and gate winding 20, resistor 26, rectifier 25 and load 14. This arrangement operates responsively to alternate half cycles of the supply voltage, such as positive half cycles for example, to apply clipped half wave alternating current across the load with the firing angle being determined by the sum of the control signals applied to windings 22, 23 and 24, in a manner similar to operation of the FIGURE 1 apparatus during one half cycle of the alternating current supply source.

Figure 4:
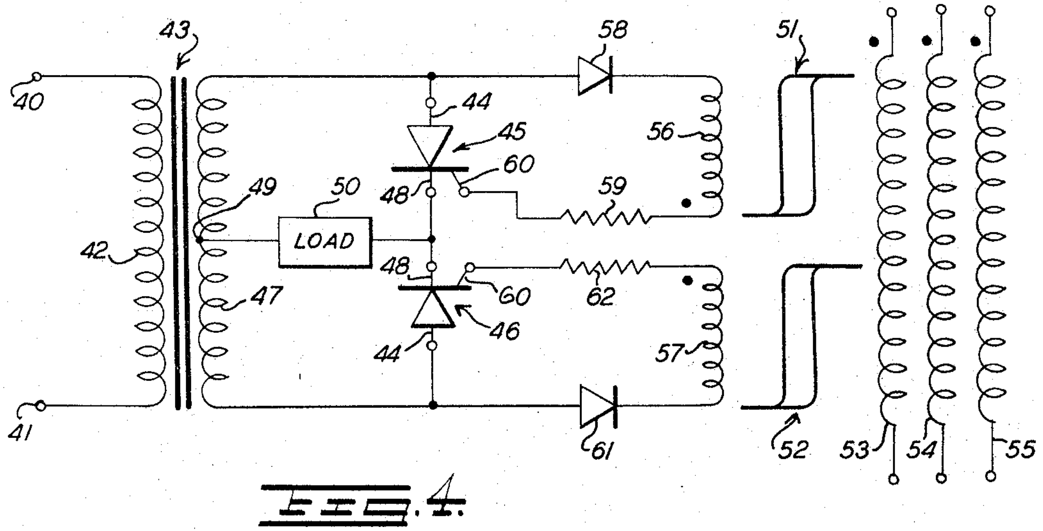
FIGURE 4 is a diagrammatic showing of a full wave rectified control apparatus embodying the principles of the present invention.

The apparatus illustrated in FIGURE 4 is operable to controllably apply full wave rectified alternating current voltage. As shown, an alternating current supply source is applied to terminals 40 and 41 of primary winding 42 of input transformer 43. Anode terminals 44—44 of solid state thyratron devices 45 and 46 are connected to opposite ends of secondary windings 47 of the transformer 43 and the cathode terminals 48—48 of the solid state devices are joined together and connected to the mid-point 49 of the secondary winding 47 through load 50. The apparatus also includes a pair of saturable cores 51 and 52 provided with a plurality of control windings such as 53, 54 and 55 and respective gate windings 56 and 57. One end of the gate winding 56 is connected through rectifier 58 to the end of the secondary winding 47 to which the anode terminal of the solid state device 45 is connected and its other end is connected through resistor 59 to gate terminal 60 of the solid state device 45. The gate winding 57 is connected in a similar manner, one end being connected to the other end of the secondary winding through a rectifier 61 and the other end being connected through resistor 62 to gate terminal 60 of the solid state device 46. This apparatus operates in a manner similar to the previously described arrangements with the cores 51 and 52 being driven to saturation during opposite polarity half cycles of the alternating current supply voltage at firing angles determined by the sum of the control signals applied to the windings 53, 54 and 55 to deliver full wave rectified output to the load 50.

Figure 5:
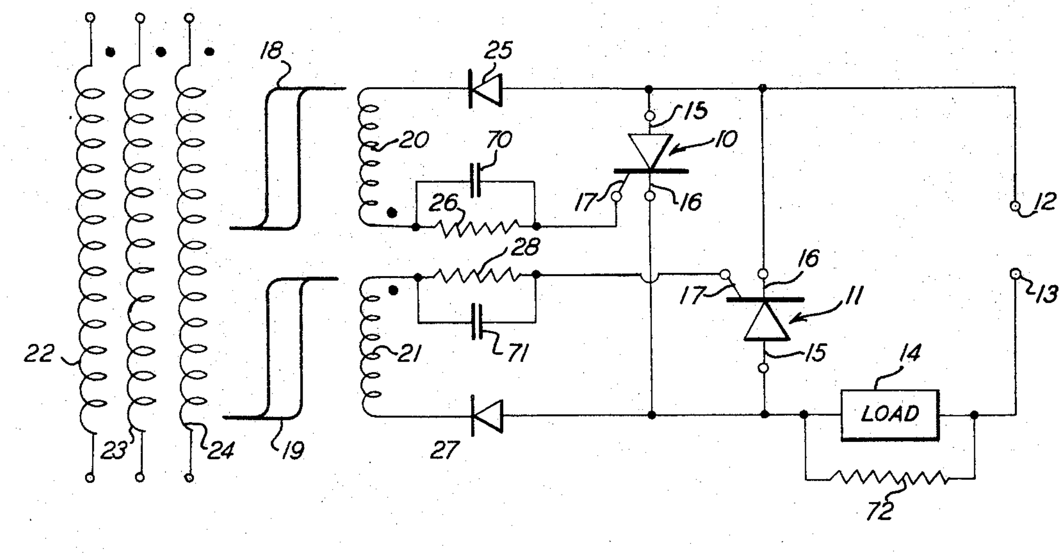
FIGURE 5 is a diagrammatic illustration of an electrical control apparatus embodying another feature of the present invention.

In the foregoing apparatuses, such as in the apparatus of FIGURE 1, the cores 18 and 19 are reset during half cycles of the alternating curnet's supply voltage of a polarity opposite the polarity of half cycles which effect their saturation, and it is preferable that the cores are reset during alternate half cycle of the alternating current supply voltage. The resetting voltage induced in the gate windings, such as gate windings 20, leaks through resistor 26, the gate and cathode terminals of solid state device 10, through solid state device 11 and rectifier 25. It is thus apparent the resetting time of either of the cores is a function of the value of resistors 26 and 28 as the case may be. When rapid resetting is required such as during alternate half cycles when the firing angle is close to zero, high values of resistors 26 and 28 are required. However, if the resistors 26 and 28 exceed a critical value abrupt current surges produced upon saturation of the cores will be blocked to such an extent that firing of the solid state devices will not result. Since resistors 26 and 28 of high value, greater than the critical value, may be required in order to obtain rapid core resetting under certain conditions, means are provided by the present invention to insure firing of the solid state devices with high values of resistors 26 and 28. FIGURE 5 shows an apparatus including novel means for accomplishing this performance. This apparatus is similar to the apparatus of FIGURE 1 with the exception that bypass capacitors 70 and 71 are associated with resistors 26 and 28, respectively. The capacitors 70 and 71 present low transient impedance and make it possible to pass the abrupt current variations, produced upon saturation of the cores 18 and 19, to the gate terminals of the solid state devices to effect their firing even though resistors 26 and 28 may be of high value. This arrangement makes it possible to employ resistors 26 and 28 of high value necessary to obtain rapid resetting of the cores while at the same time assuring application of high current surges to the gate terminals of the solid state devices to effect their firing.

In each of the forms of the invention disclosed and described above the gate circuit for the saturable cores includes an impedance which may comprise the controlled load and in the event this impedance presents a resistance above a critical value or is inductive it will not be possible to pass adequate current through the gate windings of the saturable cores. When the impedance of the gate circuit is so characterized as to present this problem, adequate operation of the apparatus may be obtained by bypassing the load device with a resistor or capacitor. For example, as shown in FIGURE 5, the load device 14 is bypassed by resistor 72 which completes the circuit for the gate current when the load 14 is characterized in such a manner as to impede the flow of adequate gate current.

Figure 6:
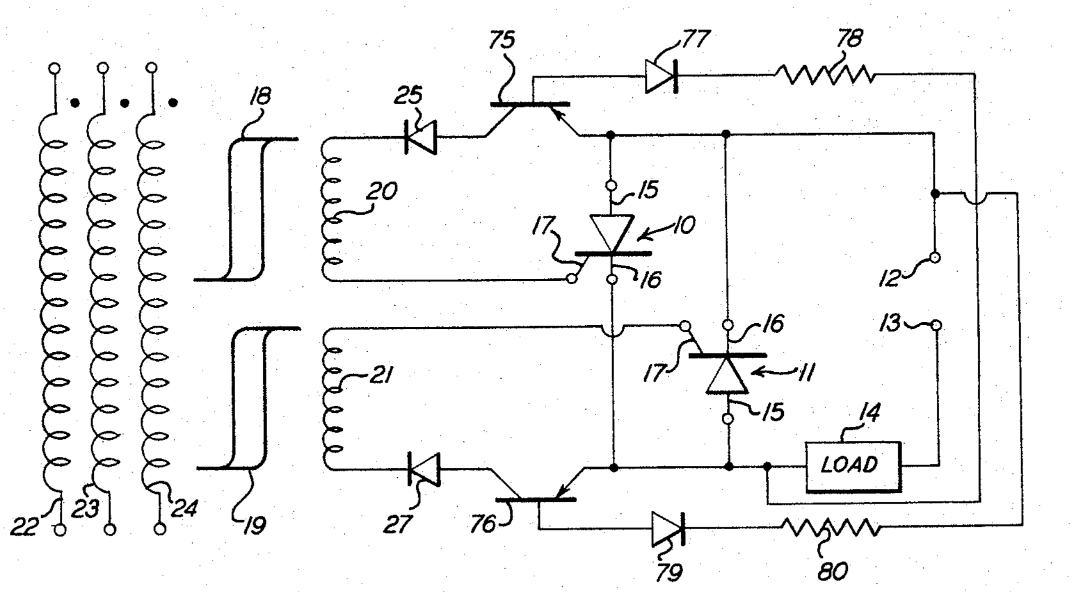
FIGURE 6 is a diagrammatic illustration of an electrical control apparatus embodying another feature of the present invention.

In some applications the use of resistors 26 and 28 of high value with bypass capacitors 70 and 71 may not prevent loading of the gate windings of the saturable cores to the extent necessary to provide extremely rapid core resetting. The apparatus shown in FIGURE 6 of the drawings comprises a novel arrangement including transistor switches for isolating the gate windings of the saturable cores during reset periods in order to achieve resetting within a minimum period of time. As shown, transistors 75 and 76, operating as switches, are connected in series with the gate windings 20 and 21, respectively, ahead of associated rectifiers 25 and 27, the base of the transistor 75 being connected through rectifier 77 and resistor 78 and the base of the transistor 76 being connected through rectifier 79 and resistor 80, to respective opposite sides of the power source. With this arrangement the transistors 75 and 76 are biased by the voltage drop across the solid state devices 10 and 11 in synchronism with the alternating current power supply so that the transistor 75 is biased "on" or is short circuited during the half cycle of the alternating current supply, such as the positive half cycle, during which saturation of the core 18 is effected, while during this same period, namely the positive half cycle of the alternating current supply voltage, the transistor 76 is biased "off" or is open circuited. Thus, the transistors 75 and 76 are operated in synchronism with the saturable cores 18 and 19 to terminate the gate windings in an open circuit during half cycles of the alternating current voltage supply during which resetting of the saturable cores takes place. This arrangement makes it possible to effect resetting of the saturable cores within a minimum period of time.

Figure 7:
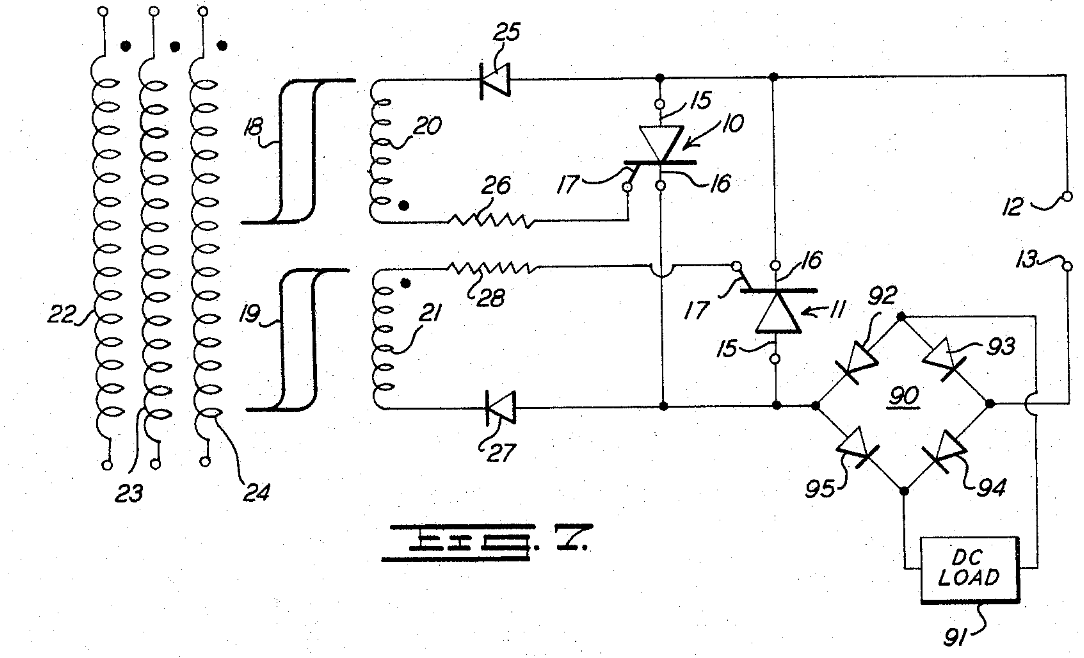
FIGURE 7 is a diagrammatic showing of another electrical control apparatus embodying principles of the present invention.

FIGURE 7 of the drawings shows another electrical apparatus embodying the principles of the present invention for controllably producing full wave rectified output. This apparatus is similar to that shown in FIGURE 1 of the drawings with the addition of a full wave rectifier 90 connected in the output circuit and feeding a DC load 91. The rectifier 90 includes diodes 92, 93, 94 and 95 having one pair of terminals connected in the circuit with the power source and another pair of terminals connected to the DC load. This arrangement operates in a manner similar to that of FIGURE 1 with the power passed by the solid state devices being full wave rectified.

Figure 8:
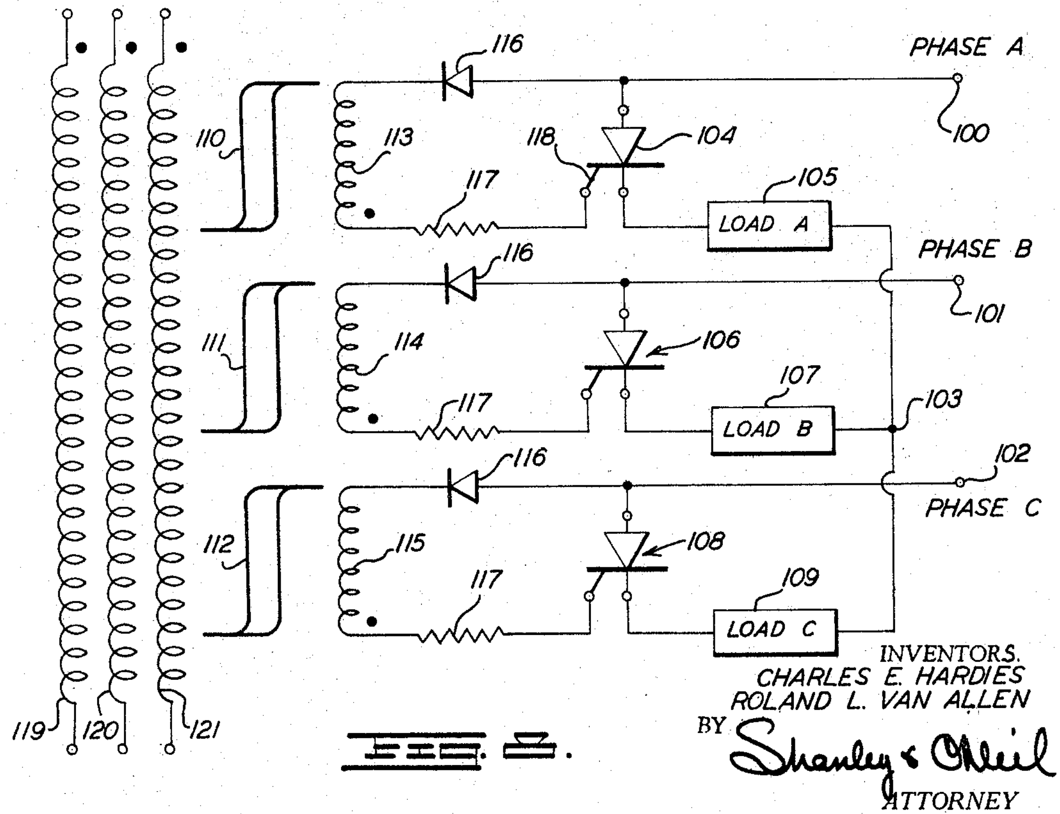
FIGURE 8 is a diagrammatic illustration of still another electrical control apparatus constructed in accordance with the principles of the present invention.

The present invention also provides electrical apparatus for controlling multiphase alternating current power. In the apparatus shown in FIGURE 8, phase A, phase B and phase C of a three phase alternating current power source are applied to terminals 100, 101 and 102 and neutral terminal 103. Solid state devices having thyratron characteristics are associated with each phase of the power source through a load impedance. As shown, solid state thyratron 104 is connected between terminal 100 and the neutral terminal through load 105, solid state thyratron 106 is connected to terminal 101 and the neutral terminal through load 107 and solid state thyratron 108 is connected to terminal 102 and the neutral terminal through the load 109. The control means for the solid state devices includes saturable cores 110, 111 and 112 respectively, each being provided with respective gate windings 113, 114 and 115. The gate windings are connected to respective phases of the power source through rectifiers 116 and to control terminals 118 of respective solid state devices through resistors 117. A plurality of control windings such as windings 119, 120 and 121 are associated with the cores 110, 111 and 112 to determine the firing angle of half cycles of respective phases of the supply source. The saturable cores 110, 111 and 112, their associated gate windings and gate circuits operate responsively to the phase of the power source to which they are connected in the manner similar to operation of the arrangement shown in FIGURE 3 to controllably apply separate phases of the power source to associated loads A, B and C. It is to be expressly understood that the principles of the present invention as disclosed in FIGURES 1, 4, 5, 6 and 7 also may be utilized to control multiphase alternating current power of any desired phase to deliver full alternating current power, half wave or full wave power to the load impedance under control of an isolated input signal or signals.

In each of the electrical apparatus described above novel means are provided for accurately controlling the firing time or energization of a solid state thyratron device or a plurality of solid state thyratron devices to apply full alternating current power or half wave or full wave rectified alternating current power to a load impedance. The firing time of the solid state device or devices is determined by an isolated control signal or the combined effect of a plurality of isolated control signals applied through control means to the saturable core or cores associated with the solid state device or devices. The character of the control means will depend upon the function desired which may require one or more control windings even in excess of the three control windings illustrated. It is to be expressly understood therefore that the principles of the present invention may be utilized to perform numerous functions including simple switching functions, power proportioning functions and switching logic functions including memory logic.

Although various forms of the invention described above include control windings adapted to be fed with direct current control signals it is to be expressly understood that the principles of the present invention may be utilized in connection with alternating current control signals. For example, the apparatus shown in FIGURE 1 may be modified by reversing one of the gate windings 20 or 21 to render the apparatus controllable responsively to an alternating current signal or signals applied to the windings 22, 23 and 24.

Each of the forms of the invention described above, although they may be designed to produce differently characterized outputs under control of an isolated signal or a multiplicity of isolated control signals, incorporates a novel magnetic circuit which provides a solution to the problems attendant control of solid state devices having thyratron characteristics, and also comprises an electrical apparatus for controlling power which approaches the ideal and provides numerous advantages over prior art devices. Some of the advantages provided by the present invention are discussed below.

The arrangement for controlling a solid state thyratron by the use of a saturable core having a gate winding connected across the power source to be controlled makes it possible to apply a control signal to the solid state device only at the instant of its firing. This insures that the solid state device will not be damaged by application of improper control signals.

The feature of utilizing firing of the solid state device to terminate its control signal renders the control signal producing means for the solid state device independent of temperature and eliminates the need for clipping networks in cases where sinusoidal alternating current voltages are employed.

The feature of effectively decoupling the magnetic circuit from the solid state thyratrons and from the load impedance upon firing of the solid state thyratrons makes it possible to deliver the total input power to the load impedance, and the gate windings of the saturable cores need possess small current carrying capacity and may be designed for maximum speed of response with material reduction in mass. Furthermore, this feature eliminates any effect on the magnetic circuit due to load changes thereby permitting apparatus according to the invention to be used in broader application.

Apparatus embodying the principles of the present invention are capable of controlling a wide range of power frequencies including 60 cycles per second up to and exceeding 400 cycles per second and the present invention makes it possible to operate solid state thyratrons in parallel relation thereby permitting the control of relatively unlimited power.

Apparatus provided by the present invention while obtaining the foregoing advantages incorporate the feature of isolation of inputs to permit the function of switching logic.

Although several apparatus, embodying different inventive features, has been disclosed and described herein it is to be expressly understood that various changes and substitutions may be made therein without departing from the spirit of the invention as well understood by those skilled in the art. For example, the feature of using bypass capacitors 70 and 71, of using a load impedance bypass resistor and of using switching transistors for controlling core resetting, although disclosed only in connection with apparatus of the type shown in FIGURE 1, may be utilized in connection with other apparatus of the present invention. Reference therefore will be had to the appended claims for a definition of the limits of the invention.

What is claimed is:

1. Electrical apparatus including a solid state device possessing thyratron characteristics and having an anode terminal, a cathode terminal, and a control terminal, the anode terminal and the cathode terminal of the solid state device being connected to an alternating current power source; a saturable core having a winding; and circuit means including rectifier means and switch means in series with the winding connecting the winding to the alternating current power source and the control terminal of the solid state device, the rectifier means being poled in the same direction as the solid state device to conduct during half cycles of the power source of one polarity and the switch means being operable during half cycles of the power source of the opposite polarity to open the circuit means connecting the winding to the alternating current power source and the control terminal.

2. Electrical apparatus including a transformer having a secondary winding and a primary winding adapted to be connected to an alternating current power source; a pair of solid state devices possessing thyratron characteristics and having an anode terminal, a cathode terminal and a control terminal; the anode terminals of the solid state devices being connected to opposite ends of the secondary winding and the cathode terminals being connected together and to a medial point of the secondary winding through a load impedance; a first core having a substantially rectangular hysteresis characteristic and a first winding associated with the first core; a second core having a substantially rectangular hysteresis characteristic and a second winding associated with the second core; one end of the first winding being connected through a first rectifier to the anode terminal of one of the solid state devices and the other end of the first winding being connected through first resistance means to the control terminal of the one solid state device; one end of the second winding being connected through a second rectifier to the anode terminal of the other of the solid state devices and the other end of the second winding being connected through second resistance means to the control terminal of the other solid state device; and winding means associated with the first core and the second core adapted to receive control signals to determine saturation characteristics of the cores; the first rectifier and the one solid state device being poled in the same direction and the second rectifier and the other solid state device being poled in the same direction but opposite to the direction of the first rectifier and the one solid state device, and the solid state devices presenting a low forward impedance between respective control terminal and cathode terminal.

3. Electrical apparatus including a pair of solid state devices possessing thyratron characteristics and having an anode terminal, a cathode terminal and a control terminal, the anode terminals and the cathode terminals of the solid state devices being fed in opposite relationship from an alternating current power source for controlling power delivered to a load means in alternate half cycles of the alternate current power source; a first core having a substantially rectangular hysteresis characteristic and a gate winding associated therewith; a second core having a substantially rectangular hysteresis characteristic and a second gate winding associated therewith; one end of the gate winding of the first core being connected through a first rectifier to the alternating current power source and the other end of the gate winding of the first core being connected through first resistance means to the control terminal of one of the solid state devices; first capacitance means connected across the first resistance means; one end of the gate winding of the second core being connected through a second rectifier to the alternating current power source and the other end of the gate winding at the second core being connected through second resistance means to the control terminal of the other of the solid state devices; second capacitance means connected across the second resistance means; and winding means associated with the first core and the second core adapted to receive control signals to determine saturation characteristics of the cores; the first rectifier and the one solid state device being poled in the same direction with respect to the alternating current power source and the second rectifier and the other solid state device being poled in the same direction with respect to the alternating current power source and in opposite relation with the first rectifier and the one solid state device, with the solid state devices presenting a low forward impedance between their respective control terminal and cathode terminal.

4. Electrical apparatus as defined in claim 3 including gate current bypass means connected across the load means.

5. Electrical apparatus including a pair of solid state devices possessing thyratron characteristics and having an anode terminal, a cathode terminal and a control terminal, the anode terminals and the cathode terminals of the solid state devices being fed in opposite relationship from an alternating current power source for controlling power delivered to a load means in alternate half cycles of the alternate current power source; a first core having a substantially rectangular hysteresis characteristic and a gate winding associated therewith; a second core having a substantially rectangular hysteresis characteristic and a second gate winding associated therewith; one end of the gate winding of the first core being connected through a first rectifier to the alternating current power source and the other end of the gate winding of the first core being connected through first resistance means to the control terminal of one of the solid state devices; one end of the gate winding of the second core being connected through a second rectifier to the alternating power source and the other end of the gate winding of the second core being connected through second resistance means to the control terminal of the other of the solid state devices; gate current bypass means connected across the load means; and winding means associated with the first core and the second core adapted to receive control signals to determine saturation characteristics of the cores; the first rectifier and the one solid state device being poled in the same direction with respect to the alternating current power source and the second rectifier and the other solid state device being poled in the same direction with respect to the alternating current power source and in opposite relation with the first rectifier and the one solid state device, with the solid state devices presenting a low forward impedance between their respective control terminal and cathode terminal.

References Cited

UNITED STATES PATENTS

| | | | |
|---|---|---|---|
| 2,722,649 | 11/1955 | Immel et al. | 318—494 |
| 2,727,969 | 12/1955 | Platte | 323—24 X |
| 2,733,395 | 1/1956 | Brown | 321—40 X |
| 2,781,479 | 2/1957 | Rice | 321—2 |
| 2,786,966 | 3/1957 | Taylor | 315—194 X |
| 2,786,967 | 3/1957 | Kuenning | 315—194 X |
| 2,809,303 | 10/1957 | Collins | 307—88.5 X |
| 2,875,351 | 2/1959 | Collins | 321—2 X |
| 2,920,240 | 1/1960 | Macklem | 315—201 |
| 2,929,011 | 3/1960 | Parsons | 323—24 X |
| 3,142,781 | 7/1964 | Izenour | 315—194 |

OTHER REFERENCES

"Solid-State Thyratron Switches Kilowatts," Electronics, Mar. 28, 1958, pp. 52–55.

JOHN F. COUCH, *Primary Examiner.*

SAMUEL BERNSTEIN, LLOYD McCOLLUM, *Examiners.*

L. P. TAK, R. A. ZAPPALA, D. J. YUSKO, G. J. BUDOCK, J. J. KISSANE, W. E. RAY, W. M. SHOOP, *Assistant Examiners.*